(12) United States Patent
Jiang et al.

(10) Patent No.: US 7,668,417 B2
(45) Date of Patent: Feb. 23, 2010

(54) INTEGRATED TERMINATION FOR EO MODULATOR WITH RF SIGNAL MONITORING FUNCTIONALITY

(75) Inventors: Wenyan Jiang, Bloomfiield, CT (US); Gregory McBrien, Glastonbury, CT (US); Joseph P. Farina, Southwick, MA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/874,619

(22) Filed: Oct. 18, 2007

(65) Prior Publication Data

US 2008/0095542 A1 Apr. 24, 2008

Related U.S. Application Data

(60) Provisional application No. 60/862,062, filed on Oct. 19, 2006.

(51) Int. Cl.
*G02B 6/12* (2006.01)

(52) U.S. Cl. .................. 385/14; 385/1; 385/2; 385/4
(58) Field of Classification Search ............... 385/1, 385/2, 4, 14
See application file for complete search history.

(56) References Cited

U.S. PATENT DOCUMENTS 6,593,829 B2    7/2003   Oldfield et al. ............... 333/22

*Primary Examiner*—Jennifer Doan
(74) *Attorney, Agent, or Firm*—Matthew A. Pequignot; Pequignot + Myers LLC

(57) ABSTRACT

The invention relates to RF termination for reducing electrical signal reflections at the end of transmission line electrodes on an electro-optical (EO) optical modulator. The disclosed termination incorporates a RF tap which permits the monitoring of the RF power and reflection conditions at the EO modulator. The integrated termination/tap can also be integrated with detection circuitry, such as RF diodes and passive components, giving improved performance, lower cost manufacturability as well as a more compact and efficient package.

11 Claims, 10 Drawing Sheets

INTEGRATED TERMINATION FOR EO MODULATOR WITH RF SIGNAL MONITORING FUNCTIONALITY

CROSS-REFERENCE TO RELATED APPLICATIONS

The present invention claims priority from U.S. Provisional Patent Application No. 60/862,062 filed Oct. 19, 2006, which is incorporated herein by reference.

TECHNICAL FIELD

The present invention relates to an integrated RF termination for an electro-optic (EO) modulator which acts both as a RF termination and RF power divider for RF signal monitoring.

BACKGROUND OF THE INVENTION

To properly operate an electro-optic (EO) modulator, minimum RF reflection at the input port (in most cases it is the input connector) is one of the most important specifications since the RF reflection could destabilize the operation of the RF signal source if the RF reflection level is too high, or corrupt the signal fidelity by adding out of phase reflected artifacts to the signal path. There are many sources of reflection in a packaged EO modulator, however, major ones are caused by three positions, i.e. the RF termination, interfaces between input connector-to-input board and input board-to-modulator chip.

The main function of the RF termination is to electrically match the impedance of the EO modulator electrode throughout the frequency band of operation to ensure minimum RF reflection at the EO modulator input port. The input connector is the packaged EO modulator's interface to the outside world. The input board is the interface between the modulator chip and input connector. The RF termination absorbs the remaining RF power with minimum perturbation to the operation of the EO modulator.

If the impedance of the RF termination perfectly matches the impedance of the EO modulator electrode throughout the operating frequency band, there will be no reflection of RF power back to the RF input port. Consequently, an adequate impedance characteristic over the operation frequency band is probably the most important feature of the RF termination. To serve as a good RF termination for EO modulator applications, other important features have to be considered such as RF power handling (or dissipation) capability, temperature stability, ease of manufacturability, small size, low cost and low parasite parameters, etc.

An electrical signal typically in the RF band is fed into the input connector. The input board provides an electrical transition between the input connector and EO modulator chip, where the optical wave propagating in the optical waveguide is modulated by the electrical or RF wave propagating in the electrodes through the Electro-Optical effect. The unused or remaining electrical or RF power is dumped into the RF terminal in the end of the electrode.

With reference to FIG. 1, an example of a simplified prior art optical communication system 100 is shown, utilizing an EO modulator 107 of the present invention. The optical communication system 100 comprises a transmitter 110, a receiver 109 and a transmission medium 108, which connects the transmitter 110 to the receiver 109. The transmission medium 108 is typically an optical fiber.

The transmitter 110 includes a laser 104, which operates in accordance with laser control signals received from a laser controller 103.

A lensed optical fiber, or fiber pigtail, 113 receives the optical signals 112. The lensed optical fiber 113 is coupled to the isolator 105, which reduces optical reflections directed towards the laser 104. In one embodiment, the optical isolator 105 is combined with a polarizer (not shown) to further reduce reflections to the laser 104. In another embodiment, the lensed optical fiber 113 is coupled directly to the EO modulator 107, rather than through the isolator 105.

The EO modulator 107 receives the optical signals 112 from the laser 104 via an input fiber 106. The EO modulator 107 includes two waveguides 114 and 115. The controller 102 controls each waveguide 114, 115 independently of the other or with one control signal. The optical signals 112 are received at an input 116 of the EO modulator 107 and are modulated in each of the optical waveguides 114 and 115. Modulated optical signals from each of the optical waveguides 114 and 115 are combined into a modulated optical signal at an output 117 of the EO modulator 107. The EO modulator 107 may perform either amplitude modulation or phase modulation or some combination to "chirp" the light of the received optical signals 112. The combined, modulated optical signal is transmitted across the fiber 108 to the receiver 109.

The controller 102 receives digital data signals from a data source 101 via a transmission line 118, and generates modulation control signals in response to the received signals. The modulation control signals are introduced into the EO modulator 107 via leads 119 and 120. The modulation control signals are indicative of a predetermined modulation of the optical signals 112 and of desired modulation chirp parameters. For example, the modulation control signals are received by the EO modulator 107, and in response, the relative propagation velocities of each of the waveguides 114 and 115 changes to generate a desired modulation chirp parameter value. A single control signal may interact asymmetrically with waveguides 114 and 115 to produce a fixed amount of chirp.

The controller 102 also introduces a bias signal via lead 121 to the EO modulator 107 which sets its operating point. The bias signal may be either preset or generated in response to changing environmental conditions such as temperature, bias drift or charge accumulation in the vicinity of the electro-optic waveguides.

The prior art system described above could advantageously incorporate a RF termination according to the invention disclosed herein within the EO modulator 107, from which an additional RF output monitoring line 122 would connect to RF detection or monitoring circuitry 123.

FIG. 2 illustrates a top planar view of a prior art packaged EO Mach-Zehnder modulator of the optical communication system 100 of FIG. 1. A fiber optic cable 206 is in optical communication with an optical input 216 of modulator chip 207. The fiber optic cable 206 presents an optical signal from a light source or laser (not shown) to the input 216. The optical signal is split into two equal signals by a first optical Y-connection 225. RF electrodes 226 and 227 form an electrical transmission line for transmitting RF signals from an electrical input port 201 to an electrical output port 202. The RF signals are supplied by an external source through RF interconnect board 228 connected to the electrical input port 201. As the split optical signals propagate along optical waveguides 229 and 230, they are modulated by the electrical field of the RF signal. The distance in which the RF signals interact with, or modulate, the split optical signals is known as the interaction distance, and is determined primarily by the modulator design.

There are mainly two types of Lithium Niobate (LiNOb3) EO Mach-Zehnder (MZ) modulators used, X-cut and Z-cut types. FIG. 2 shows only the X-cut type.

A second optical Y-connection 231 combines the two split optical signals into a single, modulated optical signal. A fiber optic cable 208 which is coupled to an optical output 217 of the modulator chip 207, presents the combined optical signal to subsequent stages (not shown) of an optical communication system.

The modulator chip 207 includes a substrate 234 which in one embodiment is made of X-cut lithium niobate (LiNbO$_3$) and is approximately 1000 microns (atm) thick. In another embodiment, the modulator chip 207 is made of Z-cut LiNbO$_3$.

The optical waveguides 229 and 230 may be created by diffusing titanium into the substrate 234. In one embodiment, the optical waveguides 229 and 230 are formed by creating a strip or channel (not shown) in the substrate 234, depositing titanium in the channel, and then raising its temperature so that the titanium diffuses into the substrate 234. The optical waveguides 229 and 230 are approximately seven microns wide and approximately three microns deep.

Summarizing, the prior art RF termination board 235 is located at the electrical output port 202 of the electrodes 226 and 227 to absorb any unused or residual RF power.

A RF termination board 235 according to the invention disclosed herein would also include an integrated RF monitoring output port 236 for advantageously providing RF monitor signal for use in detection, monitoring or feedback circuitry in a compact and easily manufactured manner.

Commonly used RF terminations for EO modulator applications are lumped element and thick or thin-film resistors. Lumped element resistors used for EO modulators are typically surface-mounted ones, as shown in FIG. 3. A thick or thin-film resistor as the RF termination, as shown in FIG. 4, is made by hybrid circuit technology.

FIGS. 3a and 3b show a top planar view and cross-section along line A-A' respectively, of a prior art example of a RF termination board 335 corresponding to the RF termination board 235 in FIG. 2. The RF termination board 335 is commonly formed on a ceramic substrate 236. Other materials with similar physical and electrical properties could also be used. A short section of RF transmission line 337, either a coplanar waveguide (CPW) or microstrip line, extends from the termination input port 302 at the edge of the RF termination board 335 to RF termination 339. The RF termination 339 can be either a resistor or complex circuitry of resistive and reactive passive components. A surface-mounted resistor in the form of a lumped element is shown in this example. The ground electrode 338 is connected through the vias 340 to the electrical ground plate 341. The electrical connection between the electrical output port 202 of the modulator chip 207 of FIG. 2 and the termination input port 302 is typically by gold wire bonding.

The main shortcoming of the lumped element resistor is its need for extra soldering process and the possibility of high parasitic microwave parameters.

FIGS. 4a and 4b are a top view and cross-section respectively of an alternative form of the RF termination board 235 in FIG. 2. This RF termination board 435 has similar components as the board shown in FIG. 3a except for the RF termination 339. The RF termination 439 is a thin- or thick-film resistor connected between RF transmission line 437 and ground electrode 438. The RF termination can also be formed by complex circuitry of resistive and reactive thin- or thick-film components. The ground electrode 438 is connected through the vias 440 to the electrical ground plate 441. The electrical connection between the electrical output port 202 of the modulator chip 207 of FIG. 2 and the termination input port 402 is typically by gold wire bonding.

A thick or thin-film resistor as the RF termination, such as shown in FIG. 4, can made by hybrid circuit technology, which is much lower cost and easier manufacturability for high-volume production, better repeatability, and smaller size compared to the lumped-element resistors. However, it is difficult to obtain a good impedance match over an appreciable electrical bandwidth.

The shape of the thick- or thin-film RF termination critically affects its frequency characteristics and inherent parasitics. An RF termination is not only an RF power absorber but also a transition section between the EO modulator electrode and the electrical ground. Various geometrical shapes have desirable affects on the terminating impedance match, especially when the length and size of the termination component is big enough to impact the RF impedance at higher frequencies. A tapered shape can be a desired shape for the transition of electromagnetic wave. In the example of FIG. 5 a taper is used in the design of electrical/RF transition between two transmission lines with quite different electrical/RF characteristics.

FIG. 5 shows top view of another prior art form of the RF termination board 435 in FIG. 4a. RF transmission line 537 extends from termination input port 502 to RF termination 539, which is a thin- or thick-film resistor with distributed resistance. The RF termination 439 is tapered from a narrow end at an end of the RF transmission line 437 to a wider end at its connection with ground electrode 438. The tapered sides of the trapezoid-shaped RF termination 439 can be described by linear, quadratic, exponential and any other gradual varying curves to ensure smooth dissipation of RF power with minimum RF reflection.

Typical configurations of a front-end RF signal detection scheme for EO modulators in optical fiber communication systems include a commercially available RF power splitter/coupler located in front of the input connector to the EO modulator. In this application, the coupler usually has high coupling ratio, that is, a high percentage of RF power goes through the main channel to the EO modulator, while only a small percentage of RF power, such as 1%, is coupled to the coupling channel for monitoring the RF signal. The small portion of RF power picked up by the coupling channel goes through an RF connector on the RF splitter/coupler, and fed to the input port of RF signal detection or monitoring circuitry. Then the tapped RF signal is detected by a (single) or two (balanced) RF diodes. The detected signal can be used as input signal for a RF signal detection circuit.

The main shortcomings of such an arrangement is the extra RF power loss and bulky size. Some RF power is lost due to tapping before the input signal is passed to the EO modulator. Additional coupler/splitters need more space and also make the manufacturing cost higher.

A configuration that attempts to address the power loss is a back-end RF signal detection scheme for EO modulators in optical fiber communication systems. A RF power splitter/coupler is located at the output port of an EO modulator. In this application, the coupler usually also has a high coupling ratio, that is, a high percentage of RF power goes through the main channel, with only small percentage of RF power, such as 1%, being coupled to the coupling channel. When the unused RF signal from the EO modulator is fed into the input terminal of the RF splitter/coupler, the majority of RF power goes through the main channel into the bulk RF resistor termination, typically 50 ohm. The small portion of RF power picked up by the coupling channel is fed to the input port of RF signal detection or monitoring circuitry, where it can be detected by a (single) or two (balanced) RF diodes.

The RF signal detection circuitry, including the RF diodes and passive components, can also be integrated into the RF termination board on a ceramic substrate using the hybrid PCB technology.

In the above examples, monitoring the RF conditions near the EO modulator involves bulky and possibly expensive components such as an RF power splitter/coupler and attendant connectors, which in themselves can be sources of parasitic impedances and reflections.

An object of instant application is to provide a termination with an RF tap for monitoring integrated on the same chip so that improved performance over a broader modulation frequency range can be achieved.

SUMMARY OF THE INVENTION

Accordingly, the present invention relates to a RF termination with in-built monitoring port which can be used to optimize EO modulator or similar device performance in a compact and low parasitic configuration.

Another aspect of the present invention relates to a RF termination which is based on a distributed resistance with a specific shape so that the input impedance of the RF termination and the output impedance of the monitoring port can be tailored to particular requirements.

BRIEF DESCRIPTION OF THE DRAWINGS

The invention will be described in greater detail with reference to the accompanying drawings which represent preferred embodiments thereof, wherein.

Figure 1:
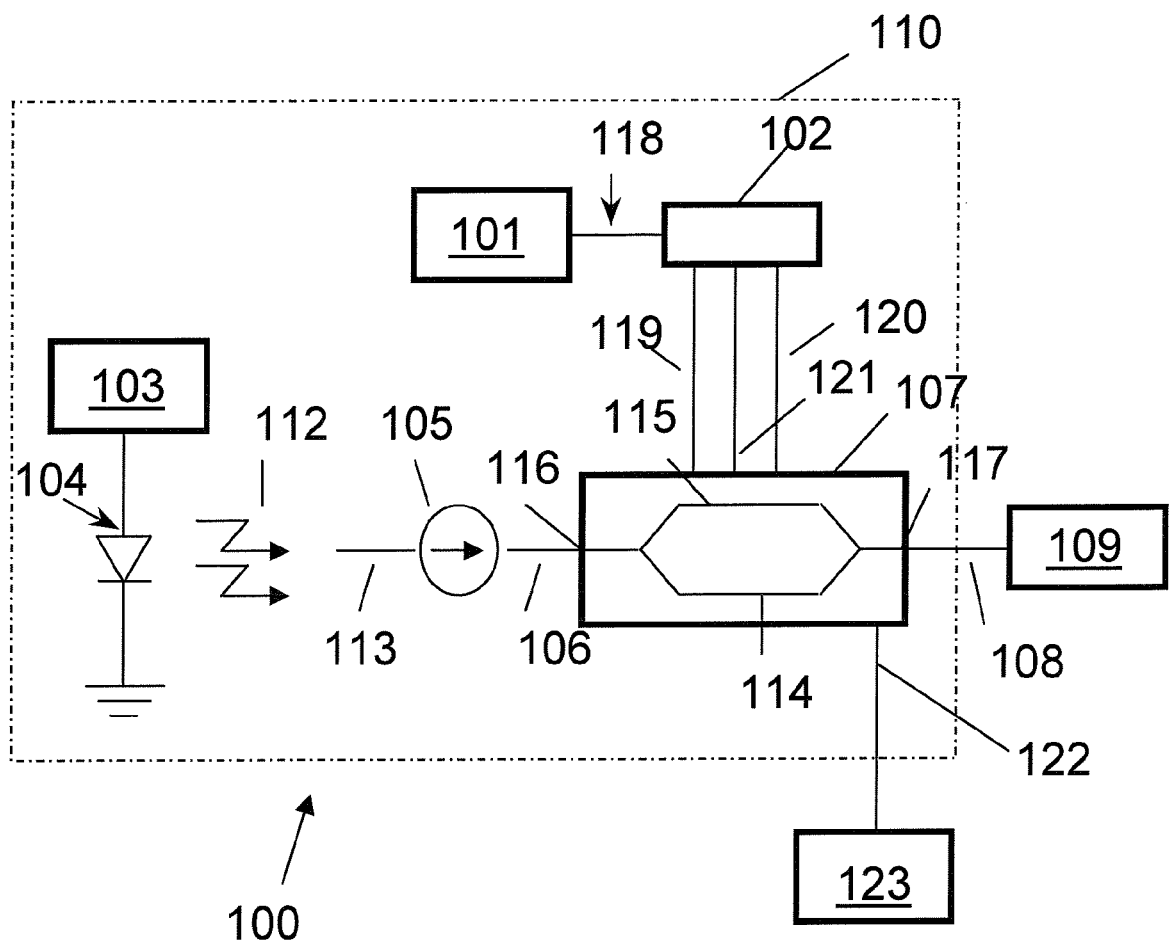
FIG. 1 shows a block diagram of an exemplary prior art fiber-optic telecommunications system including a laser diode, an external modulator and a photodetector diode, as is well-known in the field for transmitting optical signals over optical fiber or similar optical waveguide.
Figure 2:
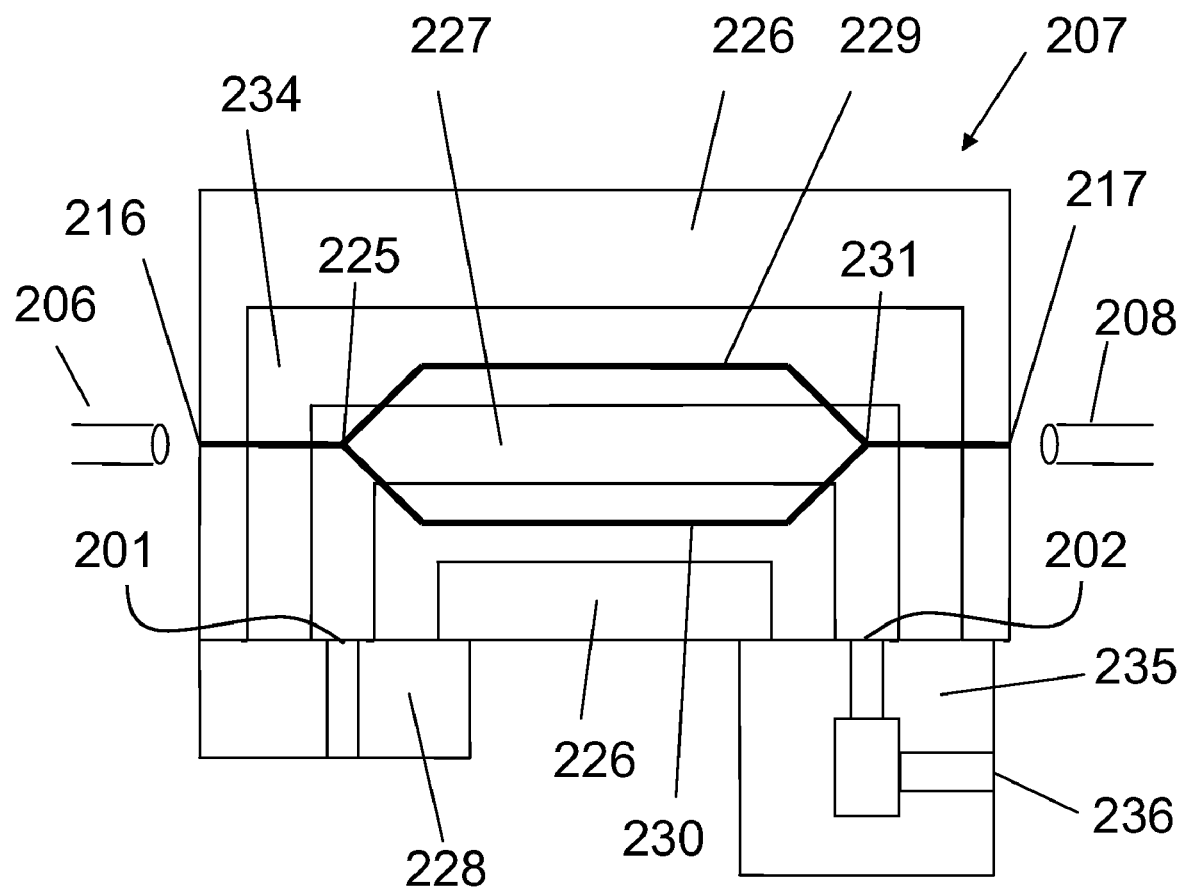
FIG. 2 shows a schematic of a typical prior art packaged electro-optical (EO) modulator with modulator chip, input interconnect and radio frequency (RF) termination.
Figure 3A:
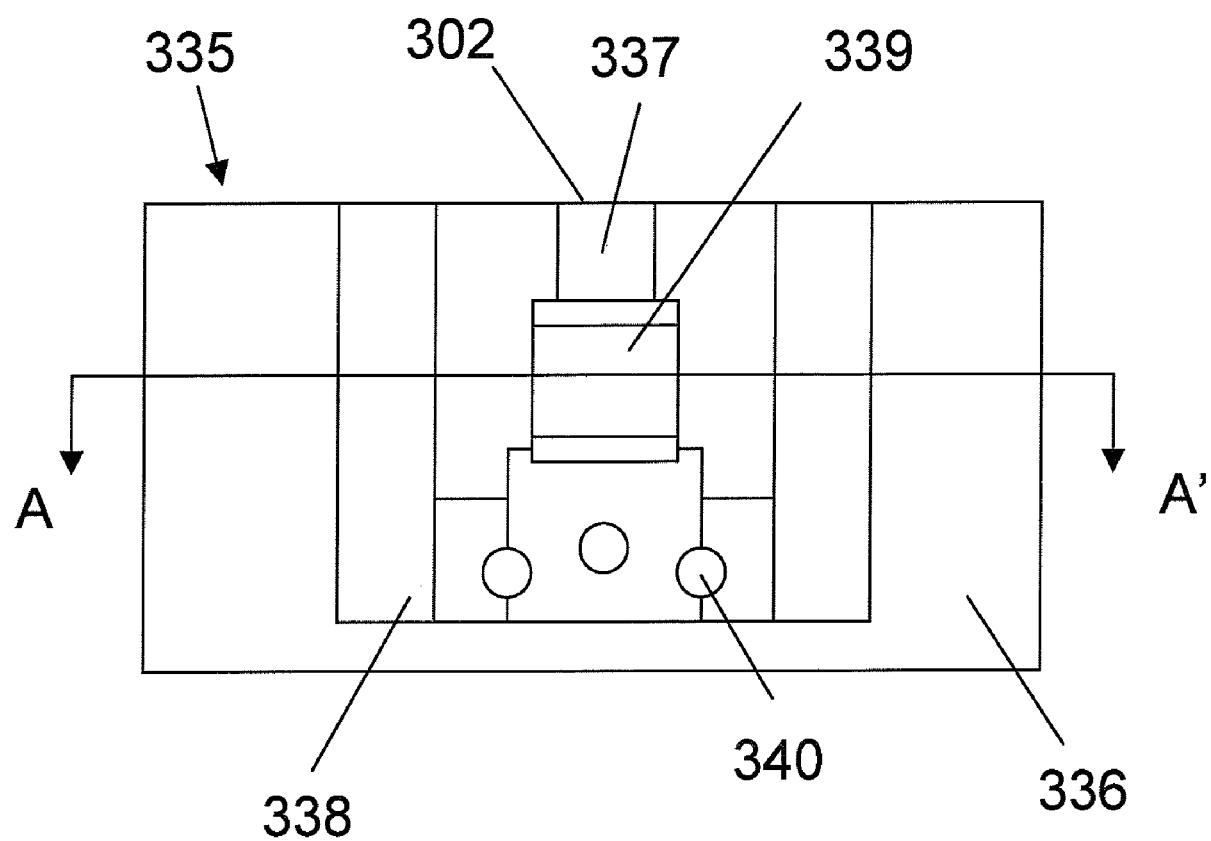
FIGS. 3a and 3b are prior art plan and cross-sectional views, respectively, of lumped element, typically surface-mounted, resistors used for EO modulators.
Figure 3B:
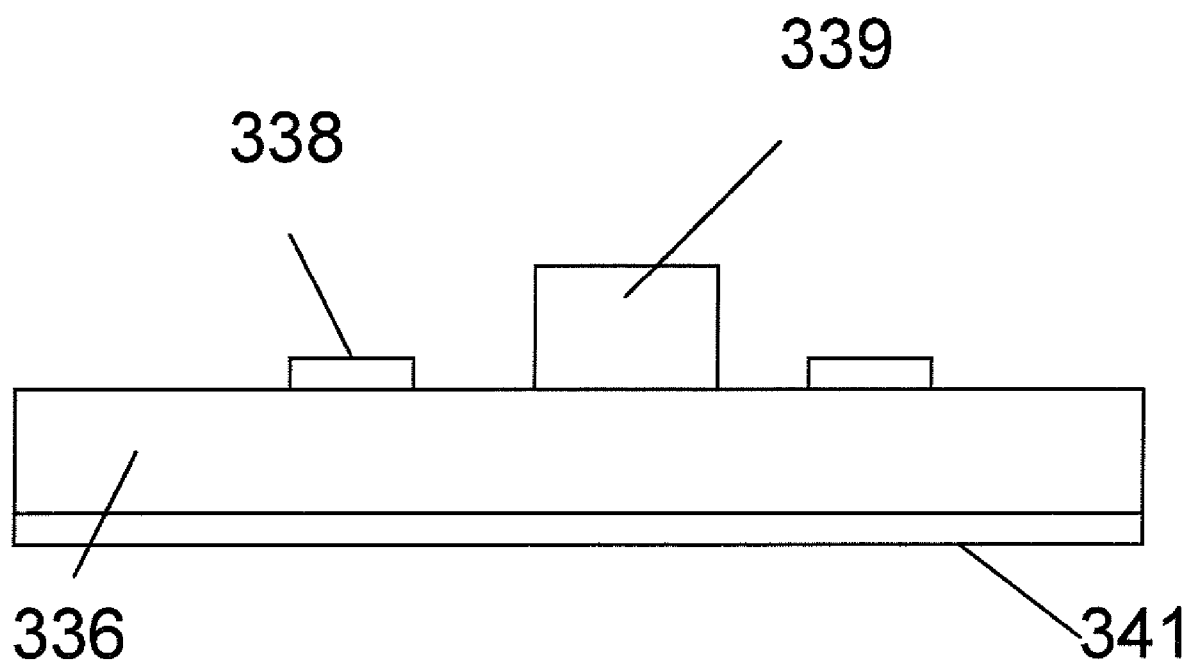
Figure 4A:
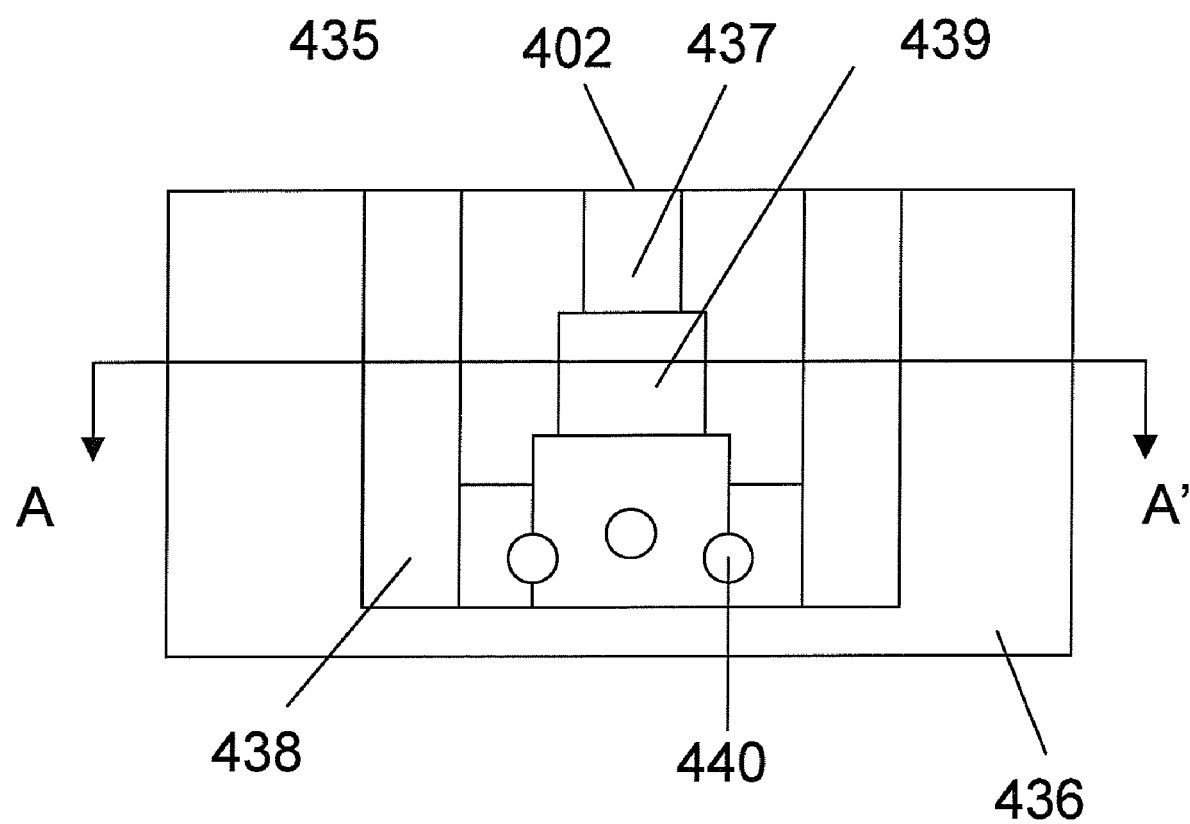
Figure 4B:
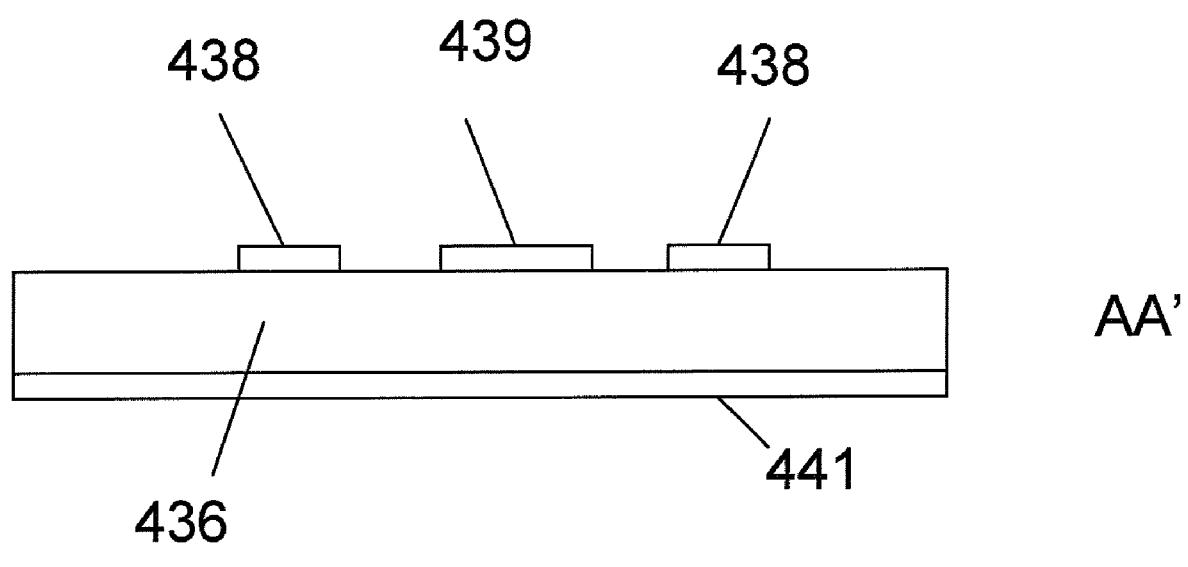
Figure 5:
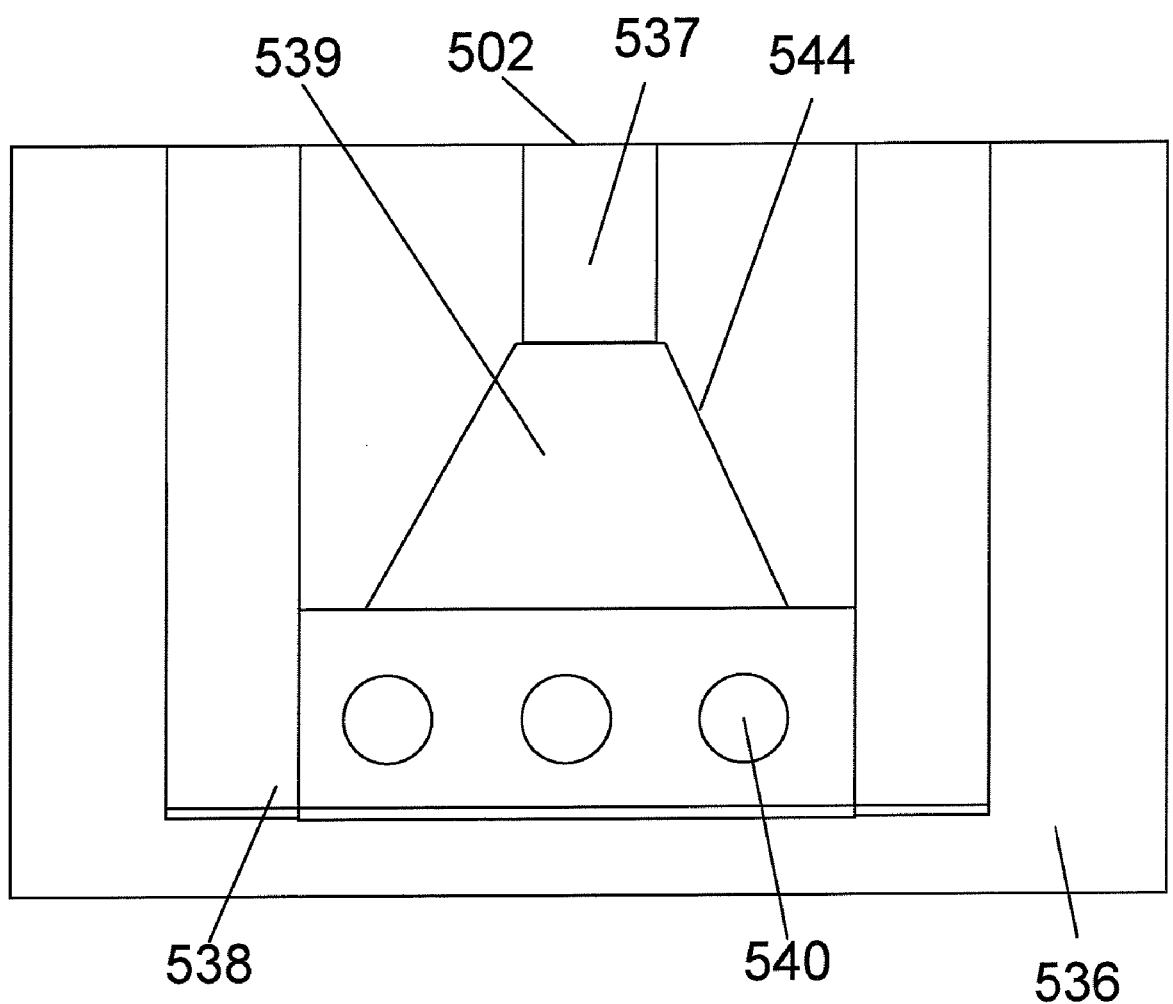
Figure 6:
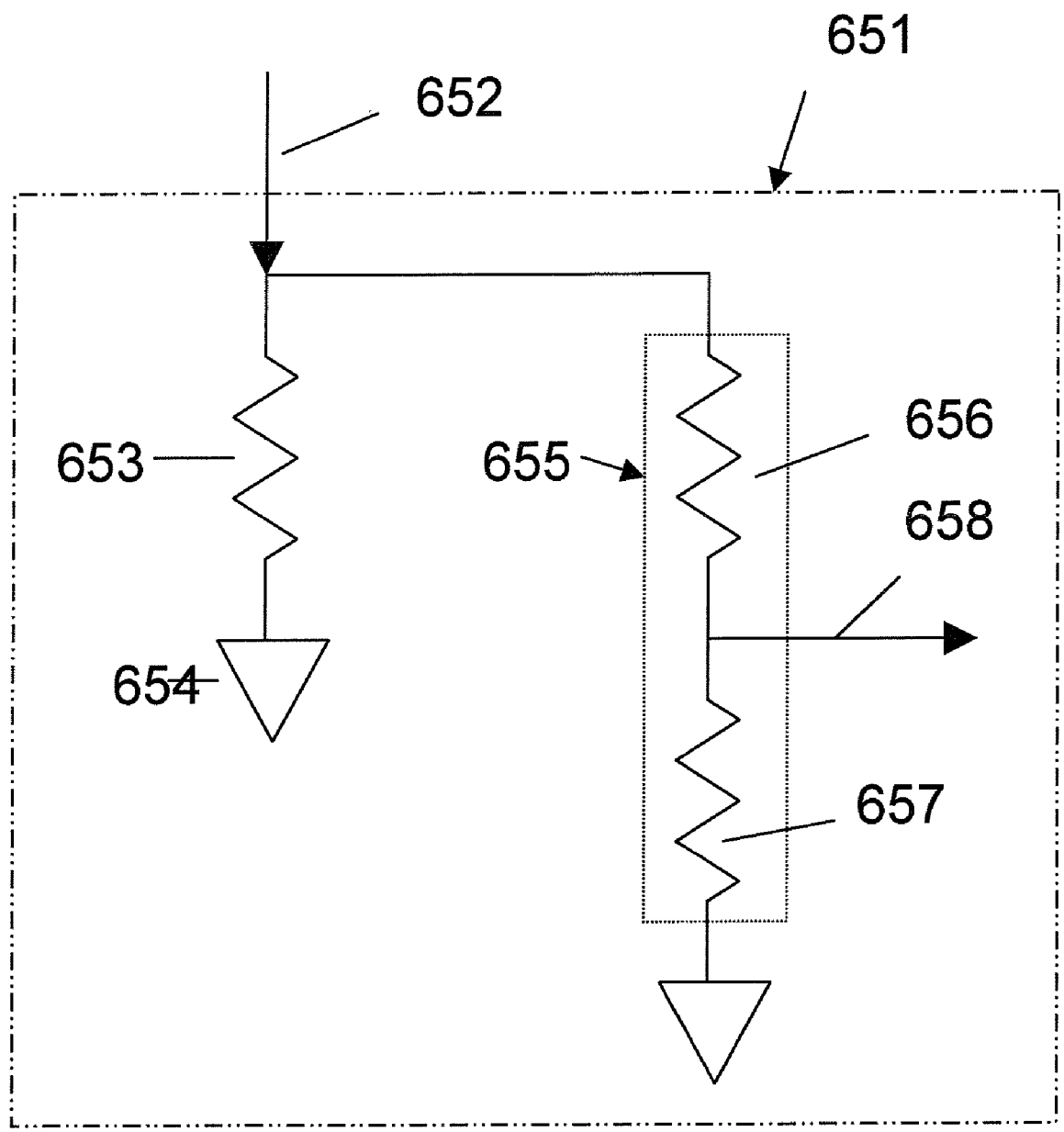
Figure 7:
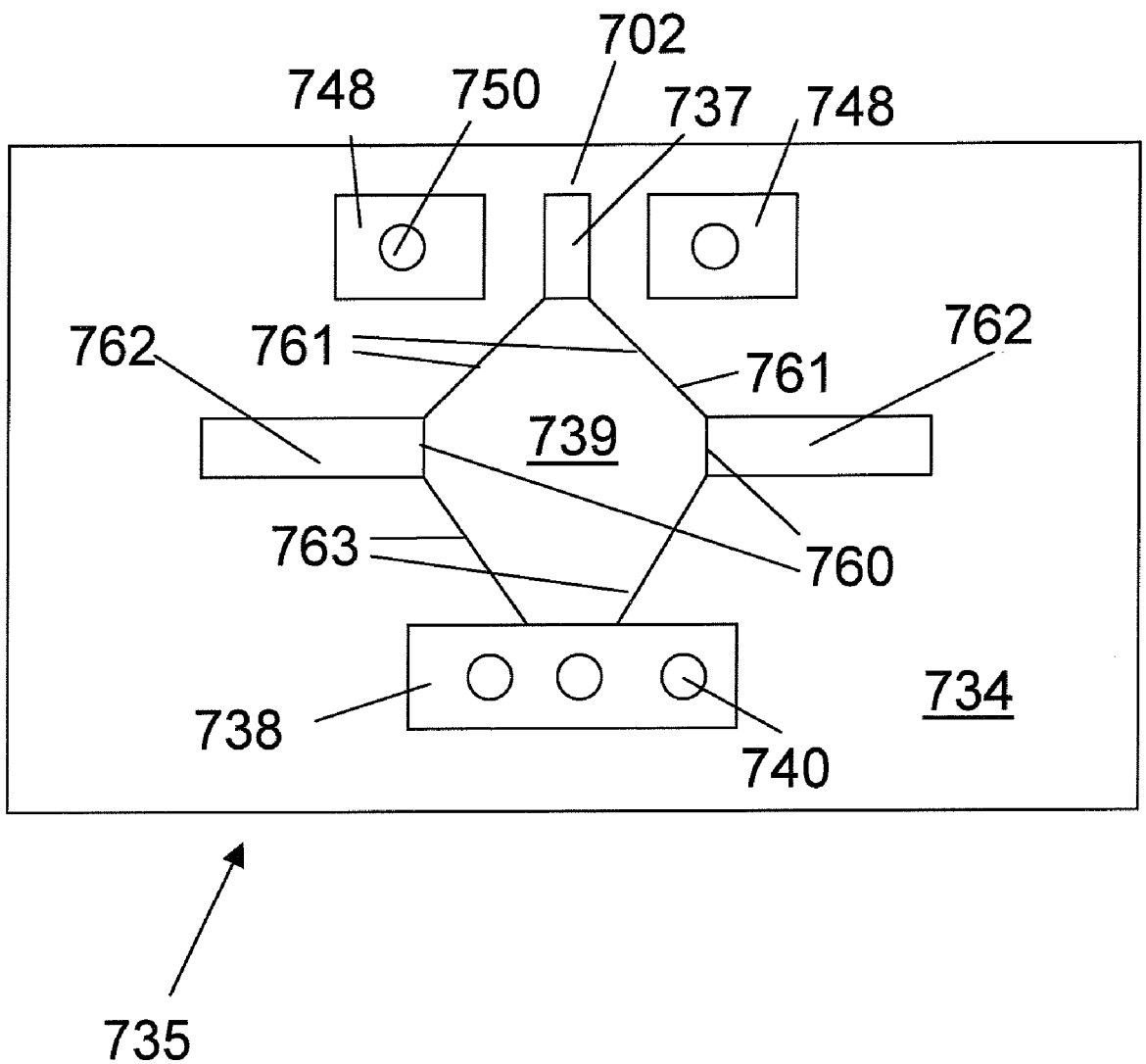
Figure 8:
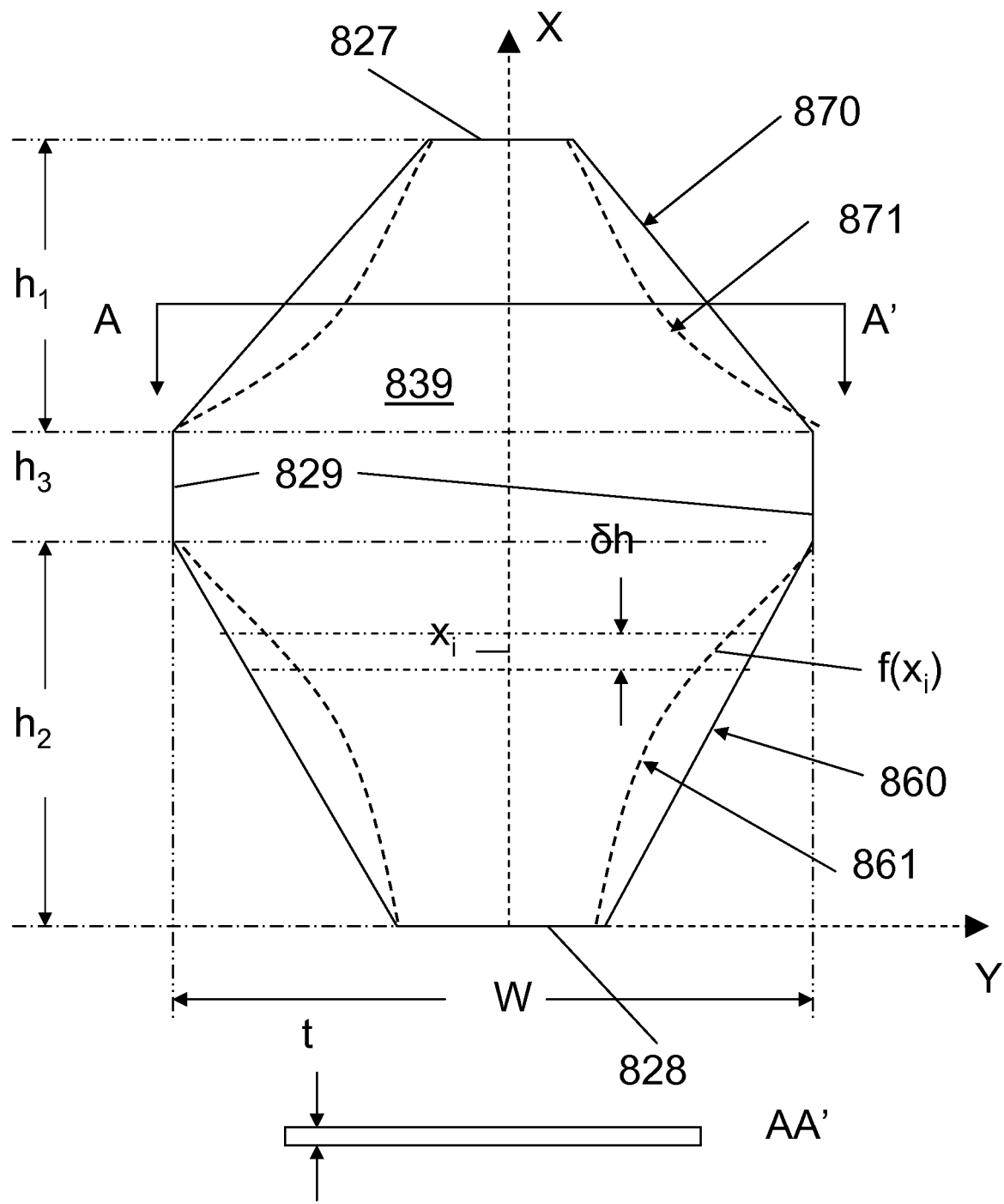

Shown in FIGS. 4a and 4b are prior art plan and cross-sectional views, respectively, of a thick or thin-film resistor as the RF termination;

FIG. 5 presents a prior art plan view of a taper used in the design of electrical/RF transition between two transmission lines with quite different electrical/RF characteristics;

FIG. 6 is an equivalent circuit schematic of a RF signal monitoring scheme in EO modulator applications according to the present invention;

FIG. 7 is a plan view of an RF termination and RF power divider combined in one element according to the present invention; and FIG. 8 gives a plan view showing design dimensions for a trapezoidally shaped distributed resistor.

DETAILED DESCRIPTION

The invention described herein combines the RF termination and RF power divider resistors in one element. The main goal is to make the integrated element into an RF termination that has excellent RF characteristics with low RF reflection and low parasitic parameters over the frequency band of operation. As an integrated termination resistor, it also acts as an RF power/voltage divider. Besides superior electrical and RF performance, the additional advantages of such a configuration are ease of design, small size, easy manufacturability, good temperature stability and low cost.

An improved scheme for concurrent RF termination and RF signal monitoring is shown as an equivalent circuit in FIG. 6. Residual RF power from an EO modulator enters the RF chip 651 via input port 652, from where it is conducted to RF power/voltage divider 655. The RF power/voltage divider 655 in such an arrangement is commonly formed by two resistors 656, 657 with a certain ratio between them according to the desired tapping value or split ratio. The tapped residual RF power is brought out at a monitor output port 658. A RF termination resistor 653 is connected between the input port 652 and ground connection 654.

Since the RF chip 651 is to be connected to an electrical transmission line output electrode of the EO modulator, the residual RF power from the EO modulator does not contribute additional RF power loss to the EO modulator. The resistors 656, 657 of the RF power/voltage divider 655 for RF power monitoring can be constructed in the form of either lumped element or thick/thin-film resistors, integrated with a RF termination resistor 653 along with RF signal detection circuitry on the same PCB. Therefore this kind of arrangement can greatly reduce the component size and manufacturing cost.

However, in this scheme the RF termination resistor 653 and RF power/voltage divider 655 comprising resistors 656, 657 are separate elements but electrically connected in parallel, as shown in FIG. 6. These two elements have quite different requirements in terms of electrical/RF performance. The RF termination resistor 653 is usually designed to perform good matching to the input port 652 over the frequency band of operation, while the requirement for the RF power/voltage divider 655 comprising resistors 656, 657 has its own requirements, such as stable pickoff ratio, ease of trimming or setting the resistor values and providing adequate source impedance at the monitor output port 658 to the monitoring diodes or other electronics. It is very difficult to design a broadband performance RF termination in circuit parallel with a good quality RF power/voltage divider.

FIG. 7 shows the top planar view of an integrated RF termination board 735. Residual RF power coming from an EO modulator (not shown in the figure) is applied to input port 702 which is connected to a RF transmission line 737. Typically multiple wire bonding is used to connect an EO modulator electrical output electrode to the RF transmission line or CPW 737, as well as an EO modulator electrical ground electrode to termination ground plate 748. The termination ground plate 748 connects to a termination electrical ground through vias 750.

The structure of the integrated RF resistor 739 is shaped to gradually taper out in a widening taper and reverse to gradually taper back in with a narrowing taper. Since the propagating resistance of a longitudinal slice of resistive material is inversely proportional to the width of the structure, the gradually increasing or decreasing width provides an ever decreasing resistance as the characteristic impedance of the taper gradually increases. The tapered structure provides a traveling wave RF impedance change, much in the same way that impedance tapers are used to match one RF impedance to another. An example would be converting from a 50 ohm characteristic impedance coaxial cable to a 75 ohm coaxial cable through use of a tapered transmission line. As a result, power is slowly dissipated down the length of the structure, as its impedance slowly decreases. In the case of the structure that tapers back down, the impedance is increased along its length, still continuing to dissipate RF power. The taper out—taper in structure provides the combination of lossless impedance contribution along with lossy impedance contribution, that produces RF power dissipation, and optimized RF impedance match.

The RF resistor 739 approximating a kite shape with truncated vertices can be considered as an electrical transmission line with varying width as it extends from the RF transmission line 737 to the a second ground plate 738. The width increases monotonically to an intermediate stage 760, where its width is constant, thereafter decreasing monotonically to where it connects to the second ground plate 738, which in turn is connected to the termination electrical ground through vias 740.

An RF tap output port is provided by RF tap electrodes 762, preferably in the form of metal bars, are connected to both sides of the RF resistor 739 at the intermediate stage 760. The tapered edges 761, 763 of the RF resistor 739 can be tailored to achieve desired characteristics such as smooth dissipation of RF power with minimum RF reflection. The profile of the tapered edges 761, 763 can be described by linear, quadratic, exponential and any other gradually varying functions of distance along the transmission line.

The RF resistor 739 can be formed from carbon-filled polymer with certain sheet resistance value. The precise target resistance value of the resistor can be realized by laser trimming.

The RF power dividing ratio or split ratio can be realized by adjusting the size of upper and lower trapezoidal portions of RF resistor 739. The tapped RF power from the RF tap electrodes 762 is fed to the input of the RF signal detection circuitry (not shown in the figure). The RF signal detection circuitry, including the RF diodes and passive components, can also be integrated into the RF termination board 735 on a ceramic substrate 734 using the hybrid PCB technology.

Values for the split ratio can generally lie in the range of −6 dB to −20 dB, but about −10 dB is preferred for most practical applications.

For the input port 702 the value of input impedance is designed to provide optimal RF matching with transmission line electrode impedance on an electro-optical (EO) optical modulator. While the impedance values vary with a particular EO modulator design, commonly ranging from about 30 ohm to about 75 ohm, about 40 ohm is typical on most LiNbO$_3$ EO modulators. The RF tap electrodes 762 on the other hand generally operate into standard 50 ohm RF circuits, so their source impedance is designed to match this value.

The DC/low frequency resistance of RF resistor 839, shaped approximately as an asymmetric rhombus with possibly curved sides, as shown in FIG. 8, can be estimated using the integral equation or summation of small slices in the horizontal direction by equation:

$$R_i = \Sigma R_s * \delta_h / [t * f(x_i)],$$

where $R_s$ is the sheet resistance of the resistive material, $\delta h$ is the height of the slice, t is the thickness of the resistive material and $f(x_i)$ is the function of the curves for the $i^{th}$ slice.

An input end 827 forms the top, while a grounding end 828 forms the bottom and tap ends 829 are on both sides of the structure of the RF resistor 829. The tapered edges 860, 870 may be straight, or curved inwards as shown by the dashed lines 861, 871 according to the function $f(x_i)$.

Consider the RF resistor 839 as consisting of three portions: two approximately trapezoidal structures and one central rectangular structure, as shown in FIG. 8. Using the equation above, the DC/low frequency resistance $R_1$ and $R_2$ can be calculated for the upper and lower portions, respectively. Similarly, the resistance of the rectangular portion, $R_r$, can also be calculated. Thus the total DC/low frequency resistance is a summation of $R_1$, $R_2$ and $R_r$.

The voltage dividing ratio required for proper operation of a RF signal detection circuit is $R_1/(R_1+R_2)$. In the structure, the total height, H, is the summation of the heights of the two trapezoidal portions, $h_1$ and $h_2$, and the rectangular sheet, $h_3$. Other parameters of the RF termination are width, W, and sheet resistivity, $R_s$.

With adjustment of the width, W, the heights of three sections, $h_1$, $h_2$ and $h_3$, and the sheet resistivity, $R_s$, the total resistance value for the desired RF termination and the voltage/power dividing ratio for RF signal detection can be individually optimized.

An integrated RF termination has been described for EO modulator applications with the functionality of RF termination and RF power/voltage divider for RF signal detection. The values of termination resistance and power divider ratio can be adjusted separately and optimized simultaneously. The single element component exhibits excellent RF/electrical characteristics, i.e. broad operational frequency bandwidth and low parasitic parameters. The integrated RF termination with double taper or similar shape allows a smooth transition from the impedance of the EO modulator electrode to the electrical ground with minimum reflection.

The integrated RF termination disclosed herein can also be used as a stand-alone component or in other types of integrated optical modulators, such as Electro-Absorption (EA) and EO MZ modulators on semiconductor material as well as in any electro-optical or optoelectronic device, which requires either RF termination only or a combination of RF termination and RF power/voltage divider.

In summary, a RF termination is disclosed for an optical modulator comprising a substrate chip having an input port for receiving a residual RF modulation signal from the optical modulator; a ground connection on the substrate chip for providing an electrical DC or RF return path; a resistive transmission line on the substrate chip having a width and a length extending from an input end to a grounded end for absorbing the residual RF modulation signal, wherein the input end is connected to the input port and the grounded end is connected to the ground connection; and a RF tap output port on the substrate chip, connected to the resistive transmission line at an intermediate stage, for coupling out a RF monitoring signal at a split ratio of the residual RF modulation signal. The split ratio is typically in the range of about −6 dB to −20 dB.

The width of the resistive transmission line may have a widening taper from the grounded end to the intermediate stage and narrowing taper from the intermediate stage to the RF input port.

The widening taper or the narrowing taper may follow a profile function which is one of linear, quadratic and exponential. The dimensions of the widening taper or the narrowing taper can be adjusted by laser trimming.

The resistive transmission line can be made of either thin film or thick film resistive material. Carbon-filled polymer is a suitable material for the resistive transmission line.

The resistive transmission line can be either a coplanar waveguide or a microstrip line.

The RF tap output port has an impedance in the range of about 30 ohm to 75 ohm.

The substrate chip comprises one of ceramic and semiconductor. Hybrid PCB technology can be used to fabricate the substrate chip.

We claim:

1. A RF termination for an optical modulator comprising:
   a substrate chip having an input port for receiving a residual RF modulation signal from the optical modulator;
   a ground connection on the substrate chip for providing an electrical DC and RF return path;
   a resistive transmission line on the substrate chip having a width and a length extending from an input end to a grounded end for absorbing the residual RF modulation signal, wherein the input end is connected to the input port and the grounded end is connected to the ground connection; and
   a RF tap output port on the substrate chip, connected to an edge of the resistive transmission line at an intermediate stage, for coupling out a RF monitoring signal at a split ratio of the residual RF modulation signal.

2. The RF termination of claim 1, wherein the width of the resistive transmission line has a widening taper from the grounded end to the intermediate stage and narrowing taper from the intermediate stage to the RF input port.

3. The RF termination of claim 2, wherein the widening taper or the narrowing taper follows a profile function which is one of linear, quadratic and exponential.

4. The RF termination of claim 2, wherein the resistive transmission line comprises a resistive material selected from one of thin film and thick film.

5. The RF termination of claim 4, wherein the resistive material comprises carbon-filled polymer.

6. The RF termination of claim 2, wherein the widening taper or the narrowing taper is laser trimmed.

7. The RF termination of claim 2, wherein the resistive transmission line is one of a coplanar waveguide and a microstrip line.

8. The RF termination of claim 2, wherein the split ratio is in the range of about 6 dB to −20 dB.

9. The RF termination of claim 2, wherein the RF tap output port has an impedance in the range of about 30 ohm to 75 ohm.

10. The RF termination of claim 2, wherein the substrate chip comprises one of ceramic and semiconductor.

11. The RF termination of claim 2, wherein the substrate chip is fabricated from hybrid printed circuit board technology.

* * * * *